US011923616B2

(12) United States Patent
Webb

(10) Patent No.: US 11,923,616 B2
(45) Date of Patent: Mar. 5, 2024

(54) ANTENNA FEED HORN WITH NEAR-CONSTANT PHASE CENTER WITH SUBREFLECTOR TRACKING IN THE Z-AXIS

(71) Applicant: Kratos Antenna Solutions Corporation, Plano, TX (US)

(72) Inventor: David Webb, Plano, TX (US)

(73) Assignee: KRATOS ANTENNA SOLUTIONS CORPORATION, Plano, TX (US)

( * ) Notice: Subject to any disclaimer, the term of this patent is extended or adjusted under 35 U.S.C. 154(b) by 0 days.

(21) Appl. No.: 18/272,544

(22) PCT Filed: Mar. 23, 2023

(86) PCT No.: PCT/US2023/016133
§ 371 (c)(1),
(2) Date: Sep. 28, 2023

(87) PCT Pub. No.: WO2023/183521
PCT Pub. Date: Sep. 28, 2023

(65) Prior Publication Data

US 2024/0047869 A1 Feb. 8, 2024

Related U.S. Application Data

(60) Provisional application No. 63/322,719, filed on Mar. 23, 2022.

(51) Int. Cl.
*H01Q 3/16* (2006.01)
*H01Q 13/02* (2006.01)
(Continued)

(52) U.S. Cl.
CPC ........... *H01Q 3/16* (2013.01); *H01Q 13/0208* (2013.01); *H01Q 19/132* (2013.01); *H01Q 19/19* (2013.01)

(58) Field of Classification Search
CPC ......... H01Q 3/16–20; H01Q 13/02–04; H01Q 15/14–22; H01Q 19/132; H01Q 19/18–195
See application file for complete search history.

(56) References Cited

U.S. PATENT DOCUMENTS 3,500,419 A * 3/1970 Sleeper, Jr. .............. H01Q 5/45 343/781 R
3,745,582 A * 7/1973 Karikomi ................. H01Q 3/16 343/837

(Continued)

OTHER PUBLICATIONS

International Search Report and Written Opinion of related PCT application PCT/US2023/016133, dated Jun. 27, 2023. 9 pages.

*Primary Examiner* — Ab Salam Alkassim, Jr.
(74) *Attorney, Agent, or Firm* — Procopio, Cory, Hargreaves & Savitch LLP

(57) ABSTRACT

A dual reflector earth station antenna (ESA) system for transmitting uplink in a first frequency band and receiving downlink in a second frequency band, the ESA system comprises a reflector; a reflector tracking assembly coupled to the reflector and configured to control the direction of the reflector; a feed horn coupled to the reflector and optimized for a near-constant phase center for both the first frequency band and the second frequency band; a subreflector tracking assembly including a subreflector, configured for tracking in the X, Y and Z-axes and supported proximate a focal point of the reflector; and a control system in communication with the subreflector tracking assembly and comprising at least one processor. The processor is configured to adjust the subreflector of the subreflector tracking assembly along X, Y and Z axes of the reflector until a signal gain of the reflector antenna is maximized for the second frequency band; and wherein a signal gain of the reflector antenna is also simultaneously maximized for the first frequency band (Continued)

due to the optimization of the feed horn for a near-constant phase center for both the first frequency band and the second frequency band.

18 Claims, 10 Drawing Sheets

(51) Int. Cl.
*H01Q 19/13* (2006.01)
*H01Q 19/19* (2006.01)

(56) References Cited

U.S. PATENT DOCUMENTS 5,485,168 A * 1/1996 Parekh .................... H01Q 5/45 343/781 P
6,266,024 B1 * 7/2001 Ramanujam ............. H01Q 3/16 343/781 CA
8,199,061 B2 6/2012 Tolleson, Jr. et al.
8,963,791 B1 2/2015 Edwards et al.
9,929,474 B2 * 3/2018 Adada .................... H01Q 15/16
10,038,251 B2 * 7/2018 Wong ................... H01Q 19/192
10,170,842 B2 * 1/2019 Adada ...................... H01Q 5/45
10,498,043 B2 * 12/2019 Adada ...................... H01Q 3/20
10,998,637 B2 * 5/2021 Adada ...................... H01Q 3/20
11,699,859 B2 * 7/2023 Adada ...................... H01Q 3/20 343/781 R
2004/0036661 A1 * 2/2004 Hanlin .................... H01P 5/107 343/786
2005/0088355 A1 * 4/2005 Kralovec ........... H01Q 13/0208 343/781 P
2009/0224993 A1 * 9/2009 Peichl ................... G01S 13/426 342/175
2011/0050526 A1 3/2011 Tolleson, Jr. et al.
2014/0259080 A1 * 9/2014 King ........................ H01Q 3/18 343/762
2015/0077304 A1 * 3/2015 Chang .................... H01Q 5/385 343/837
2016/0118715 A1 4/2016 Adams et al.
2016/0234006 A1 8/2016 Choi et al.
2017/0005415 A1 * 1/2017 Adada .................... H01Q 19/17
2019/0006770 A1 * 1/2019 Mizzoni ............. H01Q 21/0037
2019/0051991 A1 * 2/2019 Patel ........................ H01Q 5/45
2020/0185835 A1 * 6/2020 Giusto ................... H01Q 21/30

* cited by examiner

ANTENNA FEED HORN WITH NEAR-CONSTANT PHASE CENTER WITH SUBREFLECTOR TRACKING IN THE Z-AXIS

I. FIELD OF THE INVENTION

The embodiments described herein are generally directed to satellite communications, and, more particularly, to an antenna feed horn with near-constant phase center with subreflector tracking in the Z-axis.

II. BACKGROUND OF THE INVENTION

Electrically large reflector antennas enable satellite to earth station RF communication links with extremely narrow beam widths. Typically, the earth station reflector antenna is aligned with the orbital path of the target satellite via a tracking mount that orients the entire antenna assembly to align the reflector antenna with the satellite. Due to the significant weight and wind loading inherent in a large reflector antenna, tracking mounts with precision alignment capability, for example +0.05 degrees or less, significantly increase the cost and complexity of the resulting earth Station.

U.S. Pat. No. 6,943,750, "Self-Pointing Antenna Scanning" by Brooker et al., issued Sep. 13, 2005, hereby incorporated by reference in its entirety, discloses an antenna alignment assembly for a reflector antenna utilizing orthogonal adjustments made to the position of the Subreflector with respect to the main reflector. This subreflector tracking technology is particularly useful, for example, for small beam alignment adjustments between the reflector antenna and a satellite in geosynchronous orbit as the satellite wobbles and/or drifts within its orbit. Handling these small alignment adjustments via subreflector tracking technology significantly simplifies the requirements of an additional tracking mount, if any.

The systems and methods described in U.S. Pat. No. 8,199,061, hereby incorporated by reference, include additional subreflector tracking in a third axis—the 'Z' axis of the main reflector. Once implemented, this approach improves downlink (20 GHz) signal stability. However, uplink (30 GHz) stability does not improve as much as expected.

III. SUMMARY OF THE INVENTION

This disclosure provides for an improved communication system. The following summary is not intended to define every aspect of the invention, and other features and advantages of the present disclosure will become apparent from the following detailed description, including the drawings. The present disclosure is intended to be related as a unified document, and it should be understood that all combinations of features described herein are contemplated, even if the combination of features are not found together in the same sentence, paragraph, or section of this disclosure. In addition, the disclosure includes, as an additional aspect, all embodiments of the invention narrower in scope in any way than the variations specifically mentioned herein.

As disclosed herein, in an embodiment a dual reflector earth station antenna (ESA) system for transmitting uplink in a first frequency band and receiving downlink in a second frequency band, the ESA system comprises a reflector; a reflector tracking assembly coupled to the reflector and configured to control the direction of the reflector; a feed horn coupled to the reflector and optimized for a near-constant phase center for both the first frequency band and the second frequency band; a subreflector tracking assembly including a subreflector, configured for tracking in the X, Y and Z-axes and supported proximate a focal point of the reflector; and a control system in communication with the subreflector tracking assembly and comprising at least one processor. The processor is configured to adjust the subreflector of the subreflector tracking assembly along X, Y and Z axes of the reflector until a signal gain of the reflector antenna is maximized for the second frequency band; and wherein a signal gain of the reflector antenna is also simultaneously maximized for the first frequency band due to the optimization of the feed horn for a near-constant phase center for both the first frequency band and the second frequency band.

In a further embodiment, the system further includes at least one feedback sensor arranged to monitor the position of the subreflector tracking assembly at least in the X and Y axes. Further, the control system is further configured to adjust the subreflector tracking assembly via the reflector tracking assembly if the at least one feedback sensor indicates that an X or Y-axis travel limit of the subreflector tracking assembly mount has been reached.

In a further embodiment, the feed horn has an optimized varying flare angle for near-constant phase center over a range of predetermined frequencies. Further, the predetermined frequencies are 17.7-31 GHz.

In a further embodiment, the feed horn is a corrugated feed horn with varying flare angle.

In a further embodiment, the feed horn has a linear taper and very narrow flare angle of 6 degrees or less, at an aperture of the feed horn.

In a further embodiment, the feed horn has a half-cosine taper to provide a narrow flare angle at an aperture of the feed horn.

In a further embodiment, the control system is further configured to adjust the subreflector tracking assembly at a periodic interval.

As disclosed herein, in an embodiment a method for reflector tracking with a dual reflector earth station antenna (ESA) system for transmitting uplink in a first frequency band and receiving downlink in a second frequency band, the ESA system including a feed horn optimized for a near-constant phase center for both the first frequency band and the second frequency band and a subreflector tracking assembly supported proximate a focal point of a reflector and capable of tracking in the X, Y and Z-axes is disclosed. The method comprises adjusting the subreflector tracking assembly along X, Y and Z axes of the reflector until a signal gain of the reflector is maximized in the second frequency band; and whereby a signal gain of the reflector is also simultaneously maximized for the first frequency band due to the optimization of the feed horn for a near-constant phase center for both the first frequency band and the second frequency band.

In a further embodiment, the adjusting of the subreflector tracking assembly is repeated at a periodic interval.

In a further embodiment, the adjusting of the subreflector tracking assembly is initiated responsive to a change in temperature.

In a further embodiment, the adjusting of the subreflector tracking assembly is initiated responsive to a preset time.

In a further embodiment, a range of adjustment along the z-axis is less than 0.5 inches.

In a further embodiment, the adjustment is enabled by a change in the signal gain.

In a further embodiment, the method further includes adjusting the subreflector tracking assembly with respect to a recorded position of the highest signal gain within a defined period: and resetting the recorded position if the adjusting of the subreflector tracking assembly results in a higher signal gain.

In a further embodiment, the adjustment to the subreflector tracking assembly is performed via actuation of a linear actuator for each of the X, Y and Z-axis.

In a further embodiment, the method further comprises adjusting the subreflector tracking assembly via a reflector tracking assembly if at least one feedback sensor indicates that an X or Y-axis travel limit of the subreflector tracking assembly has been reached

IV. BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION OF THE INVENTION

Figure 1:
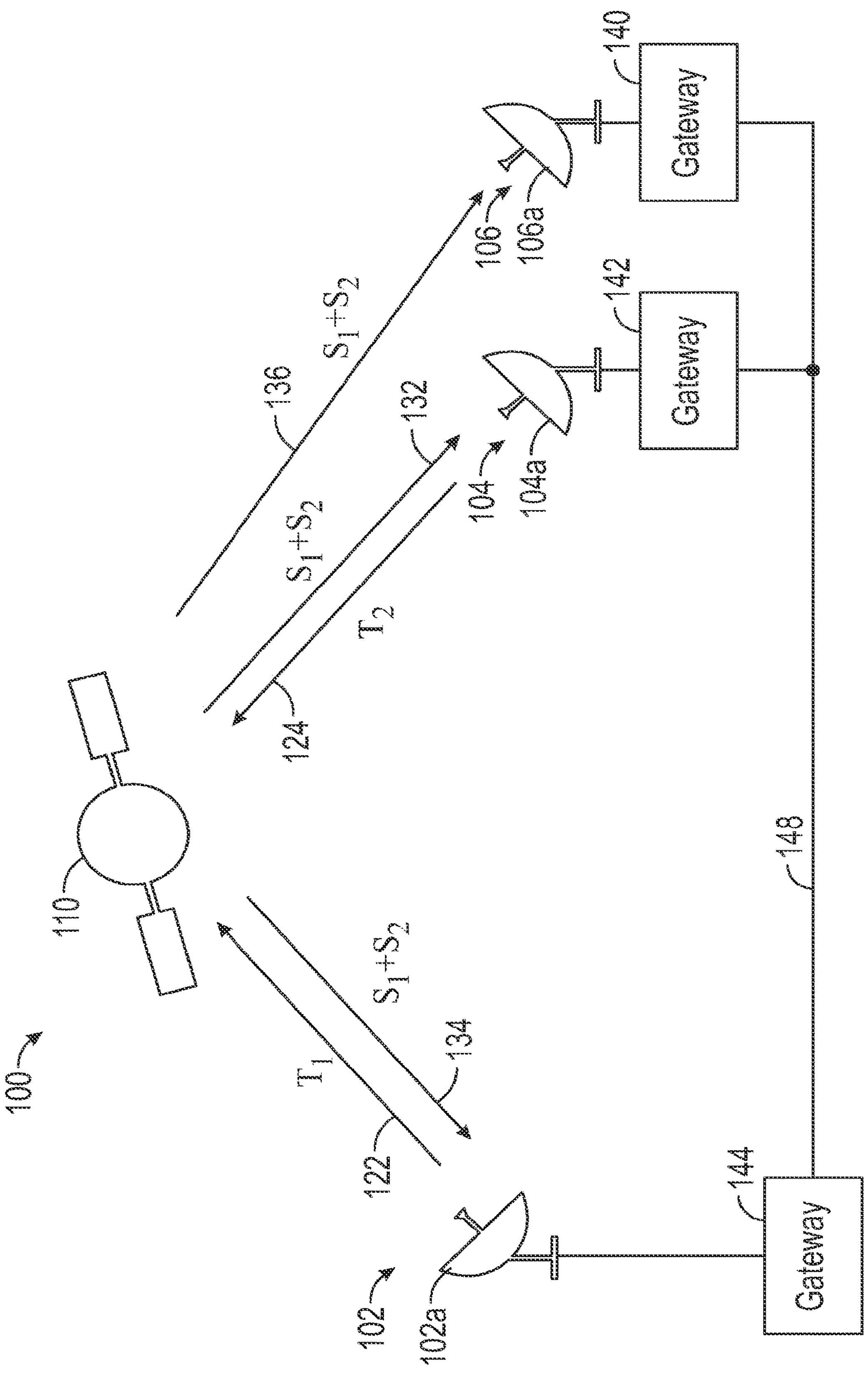
FIG. 1 is graphical depiction of an embodiment of satellite communications between a plurality of ground stations.

FIG. 1 is graphical depiction of an embodiment of satellite communications between a plurality of ground stations. A communication system ("system") 100 depicts a plurality of ground stations 102, 104, 106 communicating with one another via a satellite 110. Each of the ground stations can include a dual-reflector Earth Station Antenna (ESA) systems 102*a*, 104*a* and 106*a* respectively. Each ESA can include a subreflector tracking assembly and a tracking mount of the dual reflector antenna. In some embodiments, the communication system 100 may comprise more than three ground stations 102, 104, 106 and more than one satellite 110.

In a system, such as system 100 depicted in FIG. 1, Subreflector Tracker (SRT) technology can be used for dual-reflector ESAs (e.g., antennas 102*a*, 104*a* and 106*a* of FIG. 1, FIG. 2, and 216 in FIG. 12) which scan the antenna beam by small amounts as typically required for station keeping on geosynchronous orbit (GEO) satellites without having to move the entire antenna structure. In a 2-dimensional (2D) scan, the subreflector is laterally shifted in the XY plane perpendicular to the main reflector Z axis, which is the antenna boresight, or direction of peak radiation without subreflector scanning. This subreflector shifting performs limited scanning of the antenna beam in azimuth (AZ) and/or elevation (EL) angles away from its normal, unscanned direction without having to move the entire antenna structure as usually required for ESAs.

The systems and methods described in U.S. Pat. No. 8,199,061, can be implemented in the ground stations 102, 103 and 106. Those systems and methods allow movement of the subreflector up or down—that is, away from or closer to the main reflector surface—so that the antenna can be adaptively re-focused, for example, during normal tracking of GEO satellites as required. In one example, this is used to provide adaptive re-focusing of medium to large Ka-band antennas during thermal gradient conditions. These deformations can be due to solar or other reflector heating influences. Once implemented, this approach improves downlink (e.g., 20 GHz) signal stability but, uplink (e.g., 30 GHz) stability does not improve as much as expected. This effect is due to the feed horn phase center shifting between the two different bands. The control software and algorithms can be modified to minimize this effect. With Z axis tracking added, the antenna can be adaptively focused to maximize the downlink signal, which, for Ka band, for example, would be at or near 20 GHz.

Figure 2:
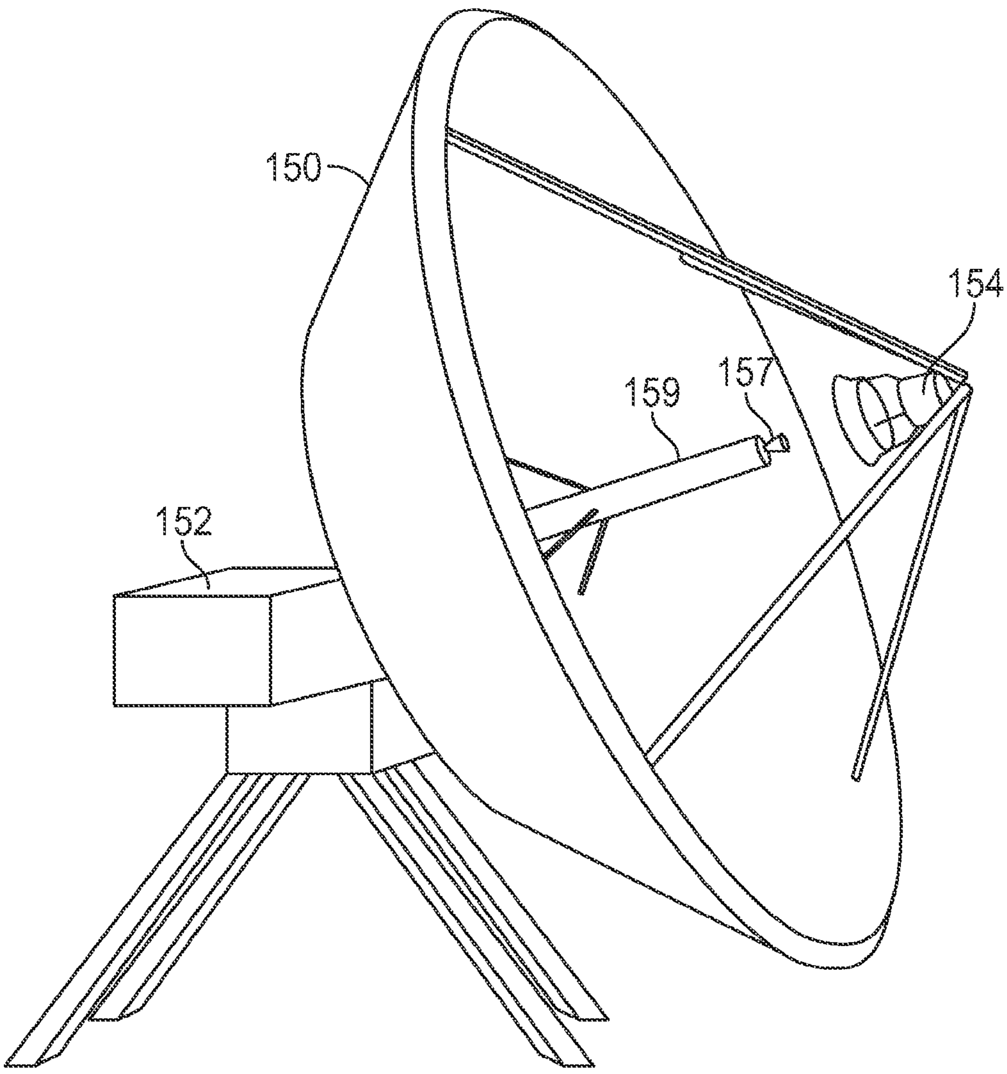
FIG. 2 is a graphical depiction of a dual-reflector Earth Station Antenna system.

FIG. 2 is a graphical depiction of a dual-reflector ESA system that can be used with various embodiments of the present invention including the system shown in FIG. 1. The ESA includes a reflector 150 having, a tracking assembly 152 for the reflector 150, and a subreflector tracking assembly 154 (including a subreflector), such as the subreflector tracking assembly 10 described in connection with FIGS. 8-11 below. The ESA further includes a feed horn 157 fixed to the reflector 150 or the support structure via an outer support tube 159. The outer support tube 159 encloses an RF network connecting the feed horn to the input (transmit) and output (receive) ports of the ESA, not shown. Collectively the feed horn 157, the outer support tube 159 and the RF network within the outer support tube 159 can be referred to as the feed assembly. The subreflector tracking assembly 154, in the embodiment depicted in FIG. 2, is supported by 4 struts in the 45 degree planes of the antenna (midway between horizontal and vertical planes). The 4 struts tie into the main reflector mechanical support structure (either passing through holes in panels or attached to supports provided on the reflector itself), and come together in an apex bracket above the subreflector tracking assembly 154. The tracking assembly for the reflector 152 controls the direction of the large reflector 150. The subreflector tracking assembly 154 controls the position of the subreflector in the X, Y and Z axes and typically scans the antenna beam by small amounts without having to move the entire antenna structure via the tracking assembly for the reflector 152.

One limitation of this approach is that performance feedback controlling this optimization method is usually limited to the downlink signal. Therefore, if the optimal focusing position of the subreflector (sub height) is different for the uplink signal, this optimization of the downlink signal can actually degrade the uplink signal to an unacceptable level. Eliminating this problem allows this adaptive focusing approach to be implemented much more aggressively to better correct even small focusing errors.

Figure 3:
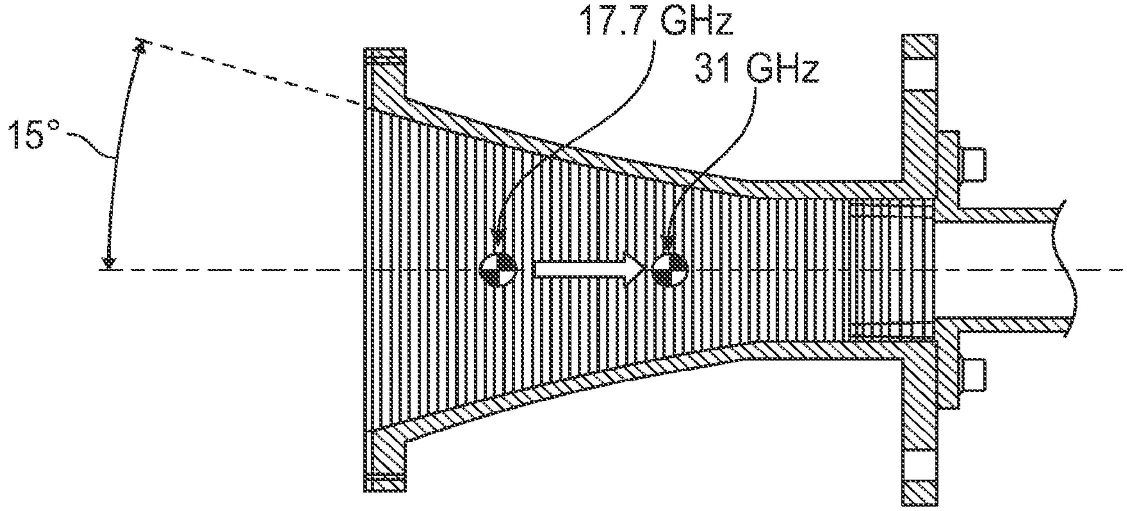
FIG. 3 is a graphical depiction of a conventional feed horn with a 15-degree semi-flare angle in which the phase center moves significantly with frequency.
Figure 4:
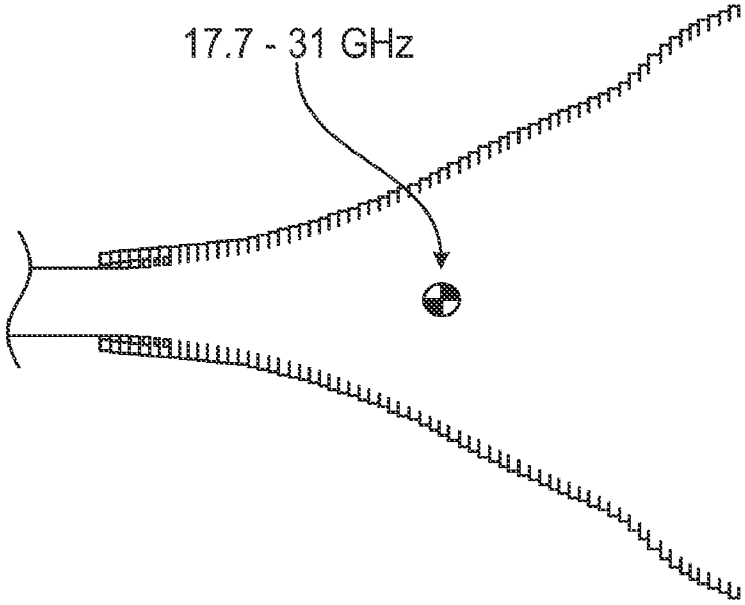
FIG. 4 is a graphical depiction of a feed horn with optimized varying flare angle for near-constant phase center over a range of frequencies of interest, i.e., 17.7-31 GHz.

The problem of different optimal sub heights for downlink and uplink signals is due to a shift in phase center of the antenna feed horn. This is apparent from comparing optimal subreflector height for two different feed horn designs, shown in FIGS. 3 and 4, in the same antenna optical system. FIG. 3 is a graphical depiction of a conventional feed horn with a 15-degree semi-flare angle in which the phase center moves significantly with frequency. FIG. 4 is a graphical depiction of a feed horn with optimized varying flare angle for near-constant phase center over a range of frequencies of interest, i.e., 17.7-31 GHz.

Figure 5:
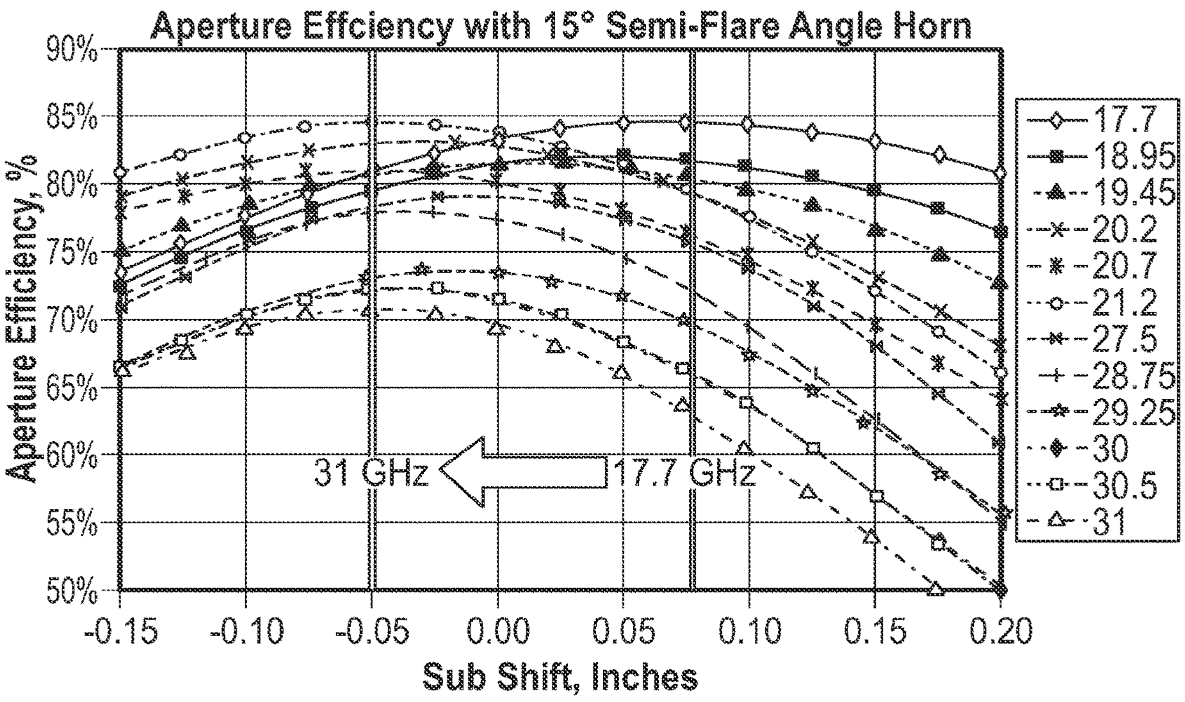
FIG. 5 is a graph of aperture efficiency for selected frequencies between 17.7 and 31 GHz over a range of various subreflector heights (sub height) for a 15-degree semi-flare feed horn.
Figure 6:
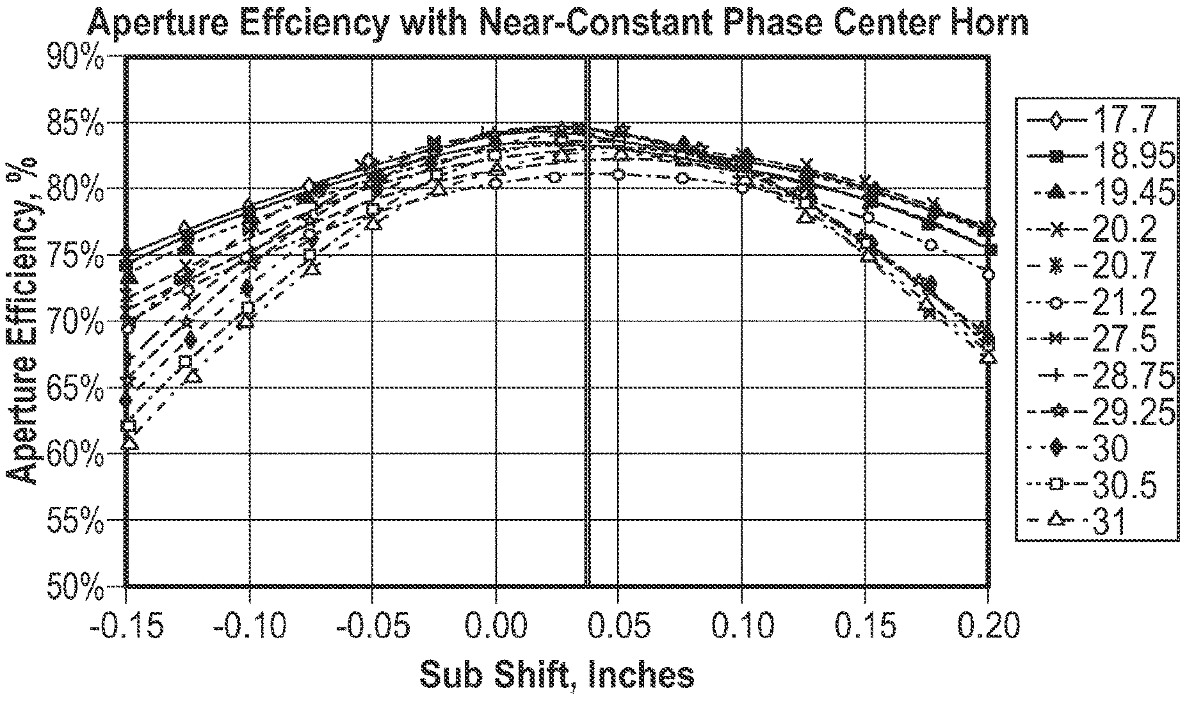
FIG. 6 is a graph of aperture efficiency for selected frequencies between 17.7 and 31 GHz over a range of various subreflector heights (sub height) for a near-constant phase center feed horn.
Figure 7:
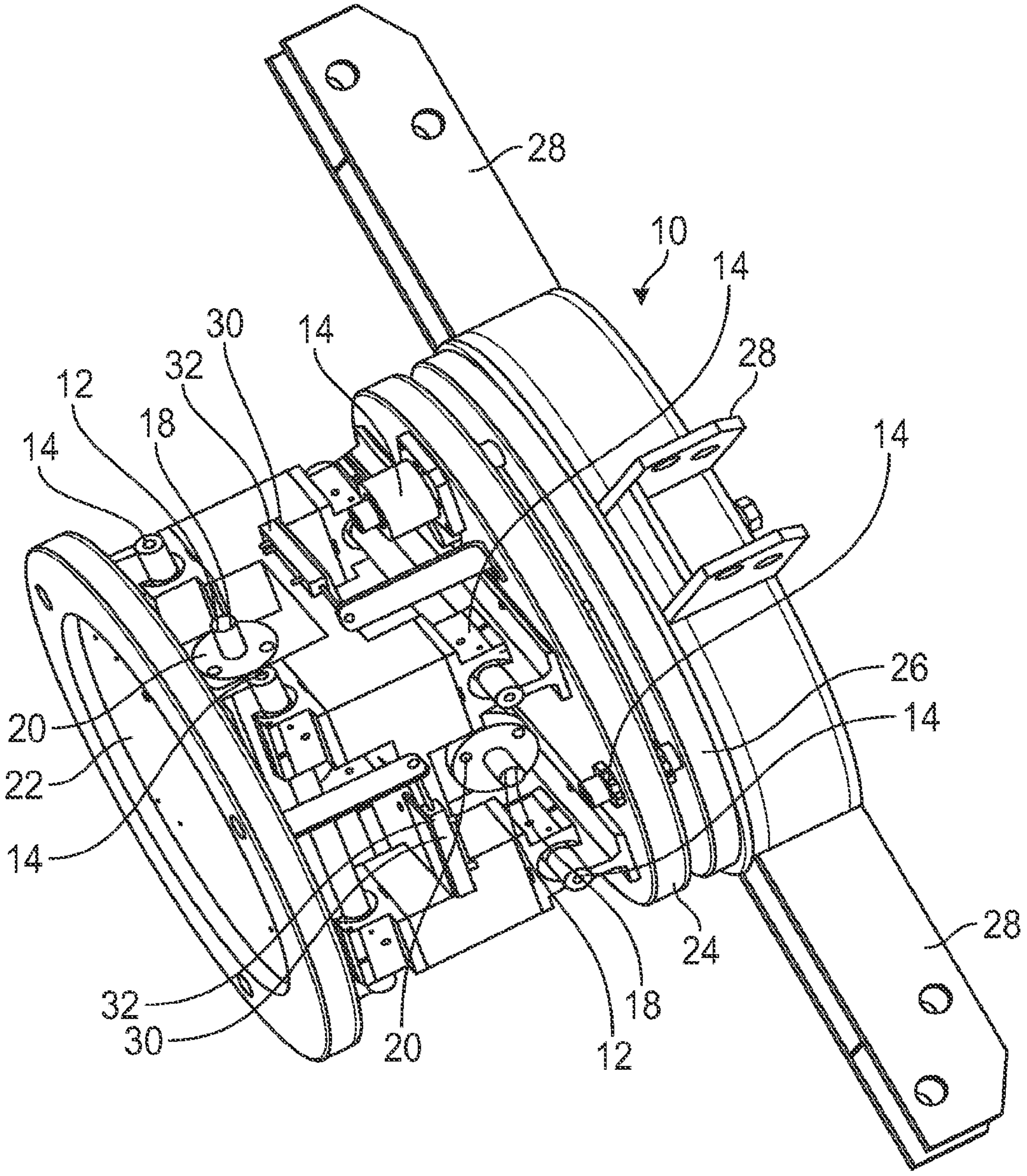
FIG. 7 is an isometric view of a subreflector tracking assembly.
Figure 8:
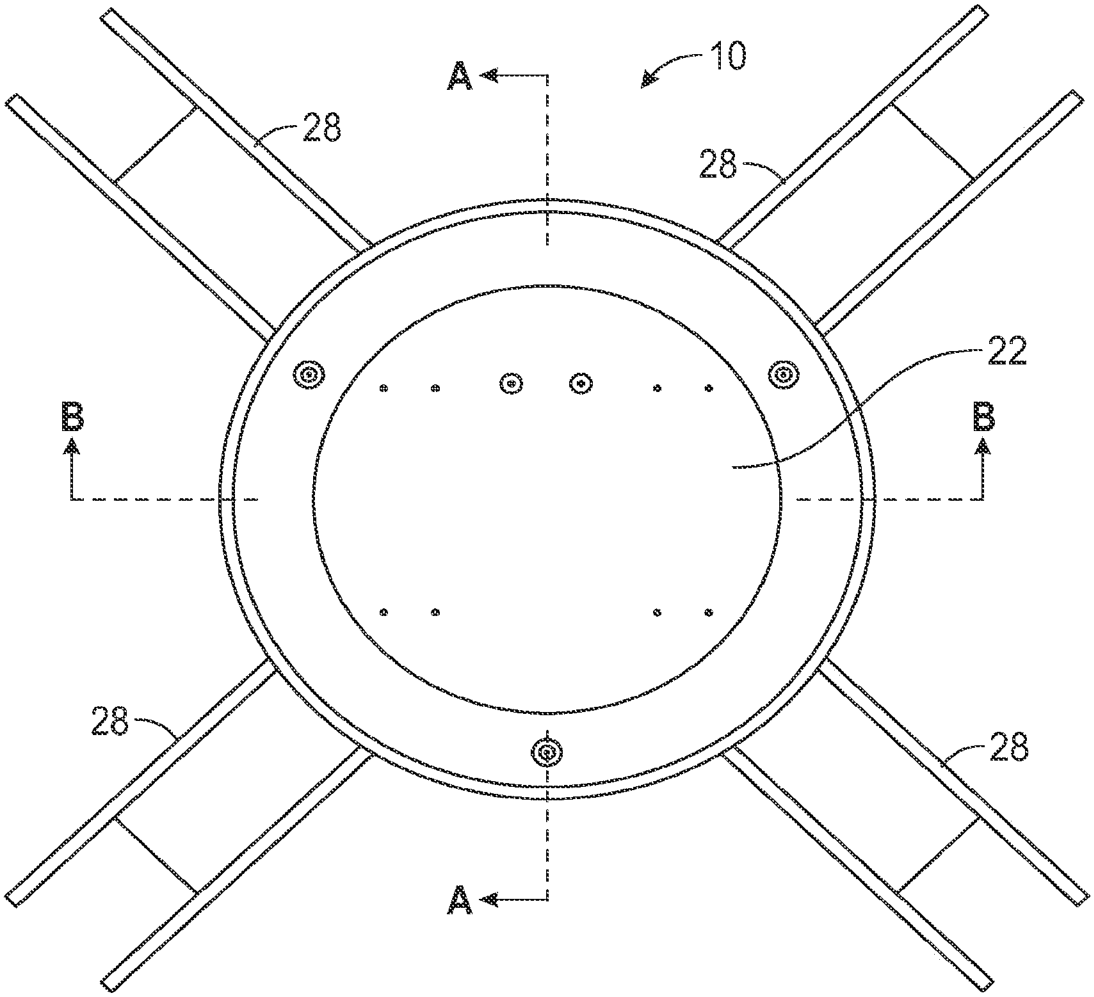
FIG. 8 is an end view of a subreflector mount end of the assembly of FIG. 7.
Figure 9:
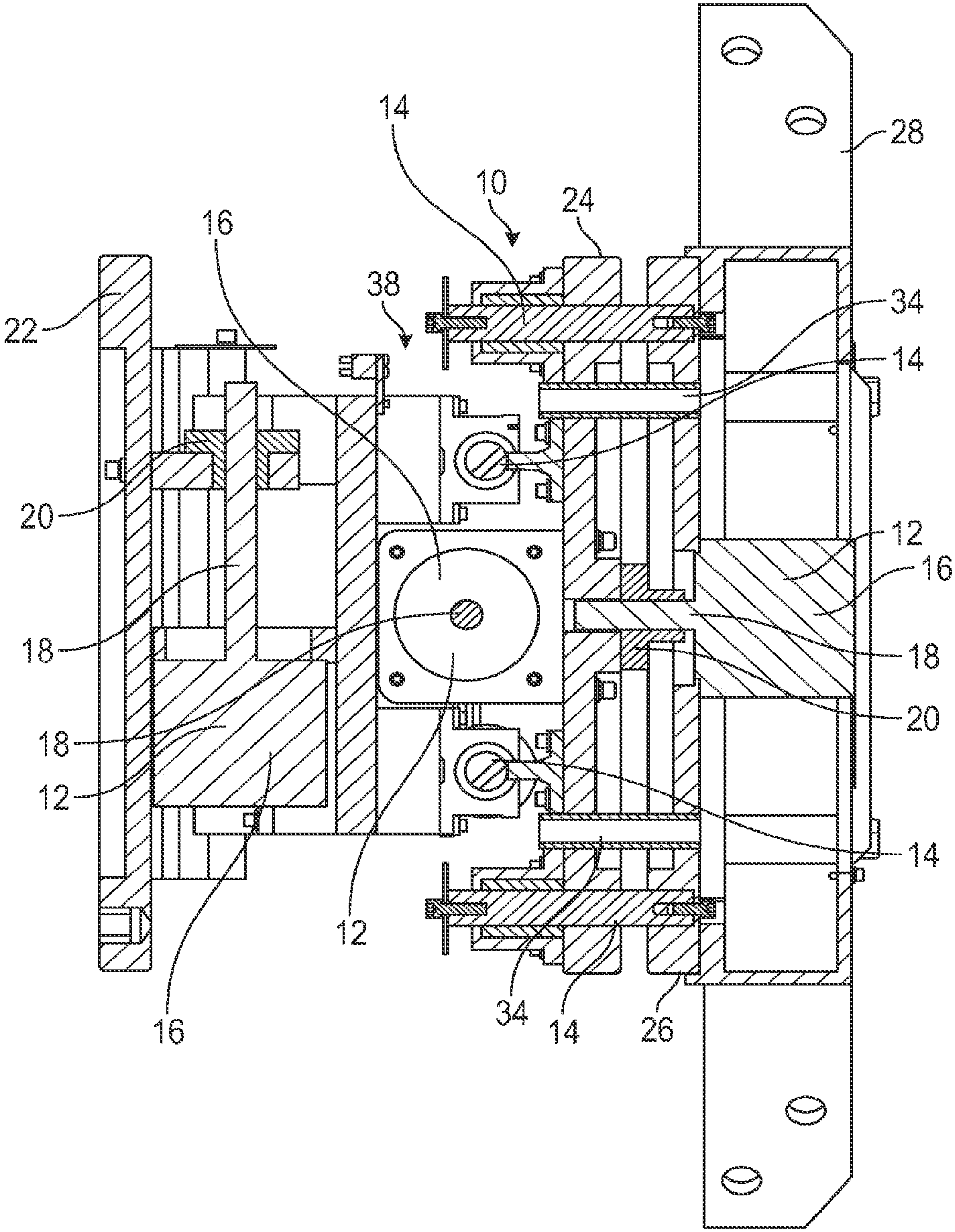
FIG. 9 is a cut-away side view along line A-A of FIG. 8.
Figure 10:
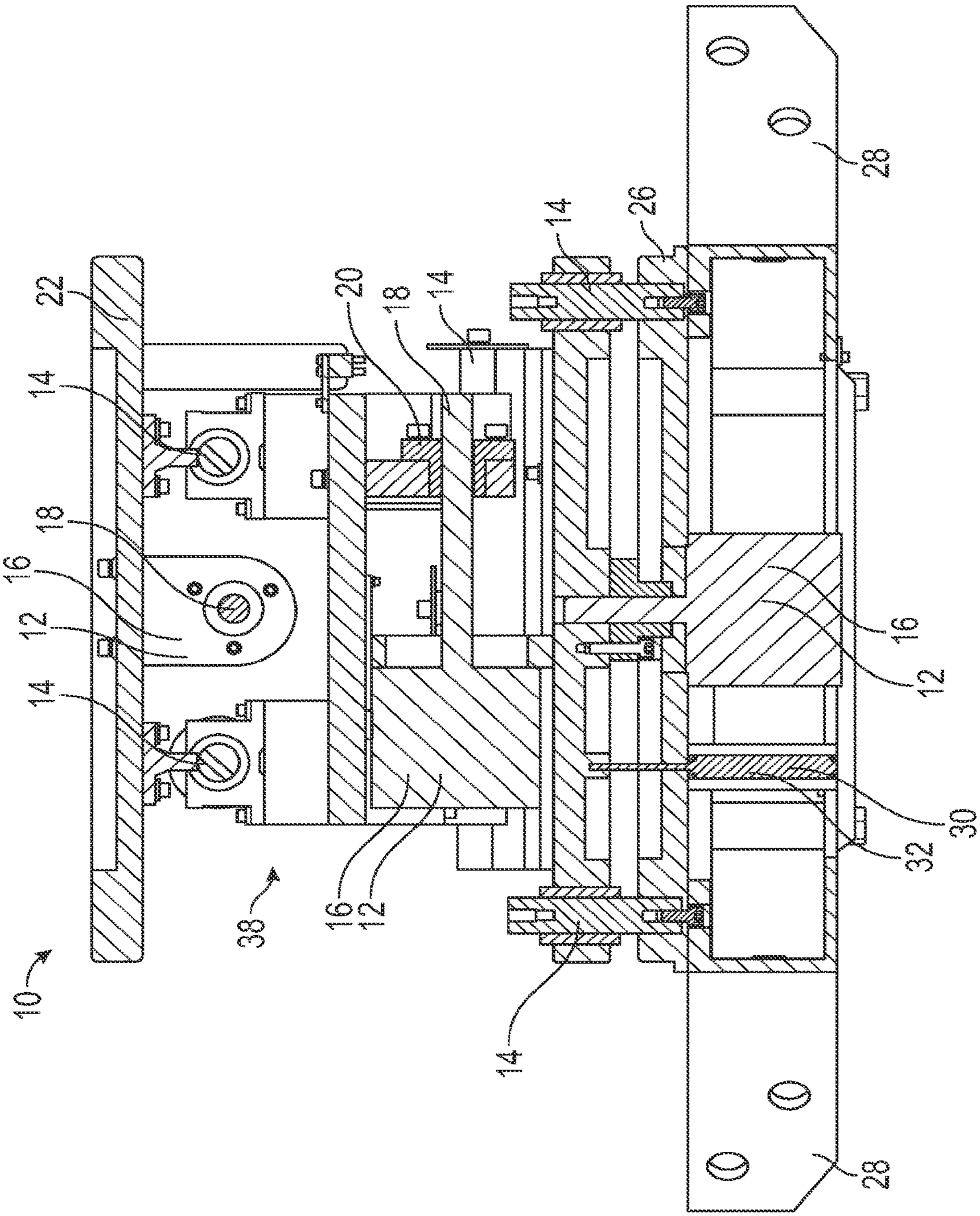
FIG. 10 is a cut-away side view along line B-B of FIG. 8.
Figure 11:
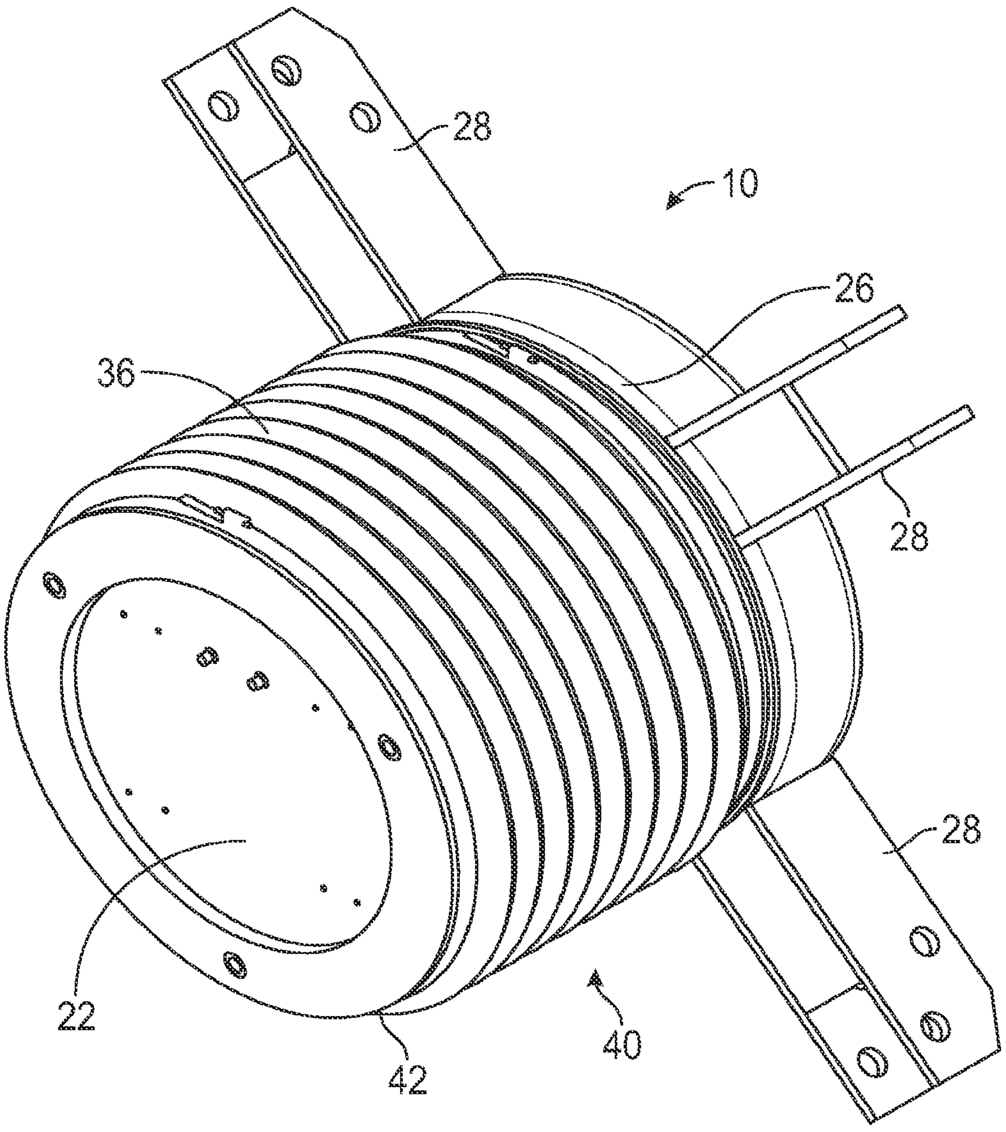
FIG. 11 is an isometric view of the assembly of FIG. 7, with a bellows coupled to the subreflector mount and the base.

FIGS. 5 and 6 are graphs of calculated aperture efficiency for the two feed horns of FIGS. 3 and 4 operating in the same dual-reflector antenna system. Note that for the conventional feed horn design with 15-degree semi-flare angle (FIG. 3), the optimal sub height varies significantly between downlink (17.7-21.2 GHz) and uplink (27.5-31 GHz) bands as is shown in FIG. 5. As the frequency increases from 17.7 to 31 GHz, the optimal sub height decreases by approximately 0.125".

Looking at the optimized near-constant phase center feed horn (FIG. 4), there is very little difference in optimal sub height over the entire 17.7 to 31 GHz frequency range as is shown in FIG. 6. Since optimal sub height is nearly constant for both uplink and downlink signals, using a near-constant phase center feed horn allows much more aggressive adaptive focusing with an SRT including Z-axis sub height adjustment, despite having performance feedback information for only the downlink signal.

Other implementations are also possible. A corrugated feed horn with varying flare angle, computer-optimized to produce nearly constant phase center, is presented above. However, this could also be realized by other types of feed horns, including those of more conventional design with linear taper and very narrow flare angle, for example, on the order of 6 degrees or less, at the feed horn aperture; these feed horns are typically very long and expensive to manufacture. Similarly, a more conventional "compact taper" feed horn with a half-cosine taper well known to those skilled in the art could also be used to provide a narrow flare angle at the aperture with associated small variation in phase center vs. frequency. These alternate approaches might be preferred particularly in those instances where the antenna optical system requires feeds of higher directivity than can be realized with the varying flare angle approach shown above in FIG. 4.

In some embodiments "near-constant phase center", refers to a feed horn that is specifically designed to reduce movement of the phase center compared with a more conventional-style feed horn. For example, in a conventional horn with linear taper (e.g., such as a 15-degree semi-flare angle, the phase center tends to move significantly inward as frequency is increased over a wide frequency band (such as 17-31 GHz). More generally, "near-constant phase center", refers to a feed horn that is specifically designed to reduce movement of the phase center compared with a more conventional-style feed horn with a semi-flare angle of 10 degrees or a more straight linear taper.

In another embodiment the near-constant phase center feed horn can be implemented by reducing the horn semi-flare angle to less than 10 degrees, which tends to minimize phase center movement over frequency. Additionally, horn semi-flare angle can be reduced to the 5-6 degree range.

A further example of "near-constant phase center" is shown in FIG. 4 for a Ka band feed horn with "nearly constant" phase center had phase center moving within a window 0.087" wide along the feed axis of revolution (Z axis), over the 17.7-31 GHz frequency band. From the calculated phase center at several frequencies across the band, the phase center varies from 5.514" to 5.601" inside the horn aperture.

The above result is using a conventional feed horn with a 15-degree definition of phase center, in which the phase center is taken to be the point inside the horn aperture, along the axis of rotation, about which, if that is the center of rotation (COR) of the horn, the far-field radiated phase is equal at 15 degree angle to the far-field radiated phase at boresight (0 degree) angle. In this example, the horn radiation is circularly polarized in a principal plane. Other definitions of phase center can also be used.

Using the same definition of 15-degree phase center for the conventional horn in FIG. 3, total variation of phase center depth relative to the aperture is 1.308".

An exemplary embodiment of a subreflector tracking assembly 10, as shown in FIGS. 8-11, demonstrates z-axis movement capability, generally parallel to the boresight of the reflector antenna and can be used with near-constant phase center feed horn to maximize performance. In one embodiment the subreflector tracking assembly 10 is controlled by a control system such as processor 204 shown in FIG. 12.

To minimize any slop, drive windup, axis wobble or backlash, the subreflector tracking assembly 10 utilizes at least one linear actuator 12 for each of the X, Y and Z-axis. Depending upon the type of linear actuator 12 selected, one or more guide(s) 14 may also be applied parallel to each linear actuator 12 to reduce mechanical loads on the linear actuator 12 and improve axial precision. The linear actuator(s) 12 may be, for example, stepper motor(s) 16 with a lead screw 18 that drives a threaded nut 20 axially along the lead screw 18. The guide(s) 14 may be, for example, self-aligning, re-circulating, ball bushing or plain linear bearings and/or rails.

In the present embodiment, X and Y-axis linear actuator(s) 12 and guide(s) 14 are mounted between a subreflector mount 22 and an intermediate support 24 arranged to provide orthogonal movement of the subreflector mount 22 with respect to the intermediate support 24. The Z-axis linear actuator 12 may be positioned between the intermediate support 24 and a base 26. The base 26 may be provided with mounting point(s) 28 for interconnection with mounting struts supporting the subreflector tracking assembly 10. The subreflector may be attached to the subreflector mount 22, positioned proximate the expected focal point of the associated main reflector. In an embodiment where the Z-axis linear actuator 12 is primarily compensating for thermal defocusing, the range of the Z-axis linear actuator 12 may be significantly less than the X and Y-axis linear actuator(s) 12. For example, an 8.1 m reflector antenna may utilize a Z-axis linear actuator 12 with a travel range of 0.5 inches or less.

The arrangement of the Z-axis linear actuator 12 and the X and Y-axis linear actuator(s) 12 on either side of the intermediate support 24 is not dependent upon which end of the subreflector tracking assembly 10 the subreflector is mounted to, and similarly which end is coupled to the mounting struts. For example, in a reversed alternative configuration, the subreflector mount 22 may be coupled to struts of the reflector antenna and the subreflector coupled to the base 26.

Spatial calculations for driving the various linear actuator(s) 12 along each axis may be simplified by arranging each of the base 26, intermediate support 24 and subreflector mount 22 parallel to one another. A feedback sensor 30 along each axis may be utilized to monitor the position of each linear actuator 12 along its range of movement. The feedback sensor 30 may be applied, for example, as a linear potentiometer 32, resolver, encoder or limit switch(s).

Control, power and/or feedback wiring may be routed through one or more sleeve(s) 34 extending through the intermediate support 24 to minimize the chance of wiring damage over time due to movement between the base 26 and intermediate support 24 driven by the Z-axis linear actuator 12. A bellows 36 coupled to a periphery of the base 26 and the subreflector mount 22 may be applied to isolate and environmentally protect an interior 38 of the subreflector tracking assembly 10 from the exterior 40. To minimize the chance of condensate buildup or the like within the assembly over time, the bellows 36 and/or the subreflector mount may be provided with one or more drain hole(s) 42.

In use, a three point peaking algorithm may be applied that monitors the signal level seen by a receiver, the signal gain, to determine the beam peak. As the linear actuator(s) 12 move the subreflector mount 22 and thereby the subreflector, changes in signal gain are monitored and further scanning movement of the subreflector tracking assembly 10 constantly driven with respect to the X, Y and Z co-ordinate location of the subreflector at the last recorded beam peak. Because the beam peak occurs when both alignment and focus is optimal, the peaking algorithm need not differentiate between scanning for optimal beam alignment or focus. Since optimal sub height is nearly constant for both uplink and downlink signals when a near-constant phase center feed horn is used, much more aggressive adaptive focusing can be used, despite having performance feedback information for only the downlink signal.

A periodic interval may be applied between scans for a further beam peak. Similarly, scans within the Z-axis may be further initiated responsive to a preset time, signal gain change, time interval and/or a temperature change, for example sensed by a temperature sensor local to the reflector antenna.

Should the peaking algorithm direct the assembly out of range in the X or Y axis, a signal and/or alarm may be generated to initiate an adjustment of a tracking mount of the antenna, to re-center the assembly.

Table of Parts for FIGS. 7-11.

10 subreflector tracking assembly
12 linear actuator
14 guide
16 stepper motor
18 lead screw
20 threaded nut
22 subreflector mount
24 intermediate support
26 base
28 mounting point
30 feedback sensor
32 linear potentiometer
34 sleeve
36 bellows
38 interior
40 exterior
42 drain hole An embodiment includes a method for reflector tracking in a dual reflector ESA, such as the dual reflector ESA described in connection with FIG. 2, for transmitting uplink in a first frequency band and receiving downlink in second frequency band. The ESA includes a feed horn optimized for a near-constant phase center for both the first frequency band and the second frequency band and capable of subreflector tracking in the X, Y and Z-axes (e.g., using the subreflector tracking assembly 10 described above). The X and Y axes, moving the subreflector laterally, in a plane perpendicular to the reflector axis of symmetry (rotation), are used to steer the beam. This is used, for example, to keep pointing at the satellite, which in general will move very slightly over time. This is equivalent to very slight pointing angle corrections in both azimuth and elevation of the entire antenna; i.e., how such tracking is accomplished in an antenna system without a subreflector tracking assembly for X and Y axes subreflector translation.

While the movement of the subreflector tracking assembly in the X and Y axes are used to steer the beam, the Z axis movement of the subreflector tracking assembly is used primarily for signal peaking.

Figure 12:
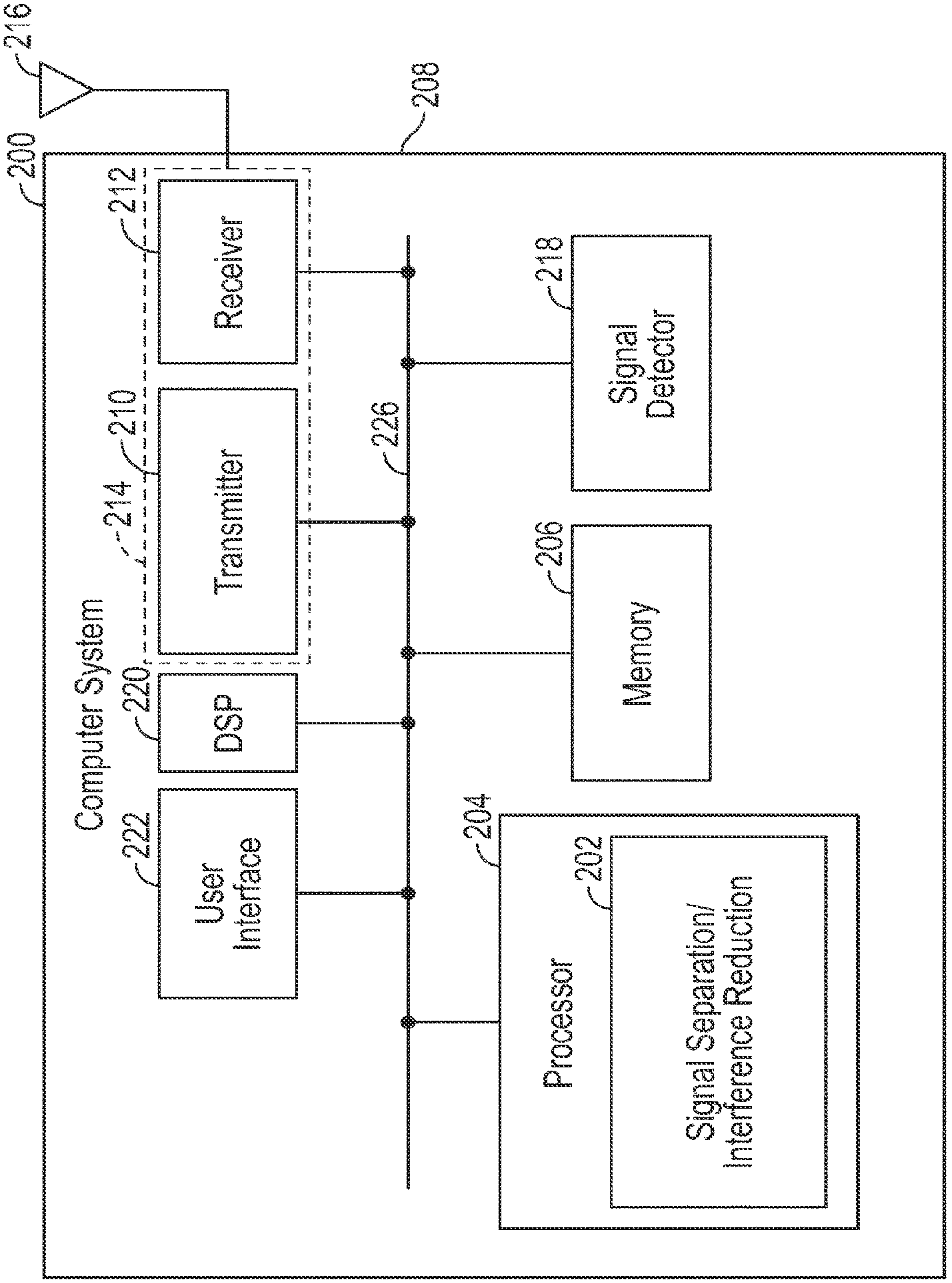
FIG. 12 is a functional block diagram of components of a communication device that may be employed within the communication system of FIG. 1.

The method can be implemented, for example, under the control of a control system such as processor 204 shown in FIG. 12. The method includes adjusting a subreflector mount (e.g., mount 22) of a subreflector tracking assembly supported proximate a focal point of a reflector antenna along an X, Y and Z-axis of the reflector antenna until a signal gain of the second frequency band received by the reflector antenna is maximized; and adjusting the subreflector mount via a reflector tracking assembly (e.g., 152 in FIG. 2) of the reflector antenna if a feedback sensor indicates that an X or Y-axis travel limit of the subreflector mount has been reached.

The method can further include adjusting of the subreflector tracking assembly at a periodic interval.

Additionally, or alternatively, the adjusting of the subreflector tracking assembly is initiated responsive to a change in temperature and/or the adjusting of the subreflector tracking assembly is initiated responsive to a preset time and/or the adjusting of the subreflector tracking assembly is initiated by a change in the signal gain.

The method can further include adjusting the subreflector tracking assembly with respect to a recorded position of the highest signal gain within a predefined period: and resetting the recorded position if the adjusting of the subreflector tracking assembly results in a higher signal gain.

FIG. 12 is a functional block diagram of components of a communication device that may be employed within the communication system of FIG. 1. As shown, communication device 200 may be implemented as the ground stations of FIG. 1. For example, each ground station 102, 104 and 106 can be implemented as an example of the communication device 200.

The communication device ("device") 200 may include one or more processors 204 which controls operation of the communication device 200. The processor 204 may also be referred to as a central processing unit (CPU). The communication device 200 may further include a memory 206 operably connected to the processor 204, which may include both read-only memory (ROM) and random-access memory (RAM), providing instructions and data to the processor 204. A portion of the memory 206 may also include non-volatile random-access memory (NVRAM). The processor 204 typically performs logical and arithmetic operations based on program instructions stored within the memory 206. The instructions in the memory 206 are executable to implement the methods described herein.

When the communication device 200 is implemented or used as a receiving node or ground station, the processor 204 can be configured to process information from of a plurality of different signal types. In such an embodiment, the communication device 200 is implemented as the ground station 106 and configured to receive and parse or separate the composite signal 136 into its constituent signals (e.g., the signal 122 and the signal 124). For example, the processor 204 can be configured to determine the frequency, bandwidth, modulation type, shaping factor, and symbol trajectory, among other transmission characteristics in order to recreate or regenerate the signals 122, 124. The processor 204 may implement various processes or methods in certain signal separation and interference reduction modules ("modules") 202 to affect such determinations.

The processor 204 may comprise or be a component of a processing system implemented with one or more processors 204. The one or more processors 204 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processor 204 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors 204, cause the processing system to perform and control the various functions described herein.

The communication device 200 may also include a housing 208 that may include a transmitter 210 and a receiver 212 to allow transmission and reception of data between the communication device 200 and a remote location. For example, such communications may occur between the ground stations 102, 104 and 106. The transmitter 210 and receiver 212 may be combined into a transceiver 214. An antenna 216, which can be at may be attached to the housing 208 and electrically coupled to the transceiver 214, or to the transmitter 210 and the receiver 212 independently. Alternatively, the antenna can be located away from the communication device 200 and connected thereto by cables. The communication device 200 may also include (not shown) multiple transmitters, multiple receivers, multiple transceivers, and/or multiple antennas.

The communication device 200 may also include a signal detector 218 that may be used in an effort to detect and quantify the level of signals received by the transceiver 214. The signal detector 218 may detect such signal characteristics as frequency, bandwidth, symbol rate, total energy, energy per symbol, power spectral density and other signal characteristics. The signal detector 218 may further be configured to process incoming data (e.g., one or more signals 122, 124) ensuring that the processor 204 is receiving a correct bandwidth-limited portion of a wireless communication spectrum in use.

The communication device 200 may also include a digital signal processor (DSP) 220 for use in processing signals. The DSP 220 may be configured to generate a data unit for transmission. The DSP 220 may further cooperate with the signal detector 218 and the processor 204 to determine certain characteristics of the composite signal 136.

The communication device 200 may further comprise a user interface 222 in some aspects. The user interface 222 may comprise a keypad, a microphone, a speaker, and/or a display. The user interface 222 may include any element or component that conveys information to a user of the communication device 200 and/or receives input from the user.

The various components of the communication device 200 described herein may be coupled together by a bus system 226. The bus system 226 may include a data bus, for example, as well as a power bus, a control signal bus, and a status signal bus in addition to the data bus. In one embodiment, the bus 226 provides communication to the various elements of the EAS system controlled by processor 204. Those of skill in the art will appreciate the components of the communication device 200 may be coupled together or accept or provide inputs to each other using some other mechanism.

Although a number of separate components are illustrated in FIG. 12, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 12 may be implemented using a plurality of separate elements. Furthermore, the processor 204 may be used to implement any of the components, modules, circuits, or the like described below, or each may be implemented using a plurality of separate elements.

The various illustrative steps and processes described in connection with the embodiments disclosed herein can be implemented or performed with one or more processors, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the functionality of modules described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiment is provided to enable any person skilled in the art to make or use the invention. Various modifications to these embodiments will be readily apparent to those skilled in the art, and the generic principles described herein can be applied to other embodiment without departing from the spirit or scope of the disclosure. Thus, it is to be understood that the description and drawings presented herein represent a presently preferred implementation of the invention and are therefore representative of the subject matter which is broadly contemplated by the present disclosure. It is further understood that the scope of the present disclosure fully encompasses other embodiments that may become obvious to those skilled in the art and that the scope of the present disclosure is accordingly limited by nothing other than the appended claims.

The invention claimed is:

1. A dual reflector earth station antenna (ESA) system for transmitting uplink in a first frequency band and receiving downlink in a second frequency band, the ESA system comprising:

a reflector;

a reflector tracking assembly coupled to the reflector and configured to control the direction of the reflector;

a feed horn coupled to the reflector and optimized for a near-constant phase center for both the first frequency band and the second frequency band;

a subreflector tracking assembly including a subreflector, configured for tracking in the X, Y and Z-axes and supported proximate a focal point of the reflector; and a control system in communication with the subreflector tracking assembly and comprising at least one processor configured to:

adjust the subreflector of the subreflector tracking assembly along X, Y and Z axes of the reflector until a signal gain of the reflector antenna is maximized for the second frequency band; and wherein a signal gain of the reflector antenna is also simultaneously maximized for the first frequency band due to the optimization of the feed horn for a near-constant phase center for both the first frequency band and the second frequency band.

2. The system of claim 1 further comprising at least one feedback sensor arranged to monitor the position of the subreflector tracking assembly at least in the X and Y axes.

3. The system of claim 2 wherein the control system is further configured to adjust the subreflector tracking assembly via the reflector tracking assembly if the at least one feedback sensor indicates that an X or Y-axis travel limit of the subreflector tracking assembly mount has been reached.

4. The system of claim 1 wherein the feed horn has an optimized varying flare angle for near-constant phase center over a range of predetermined frequencies.

5. The system of claim 4 wherein the predetermined frequencies are 17.7-31 GHz.

6. The system of claim 1 wherein the feed horn is a corrugated feed horn with varying flare angle.

7. The system of claim 1 wherein the feed horn has a linear taper and very narrow flare angle of 6 degrees or less, at an aperture of the feed horn.

8. The system of claim 1 wherein the feed horn has a half-cosine taper to provide a narrow flare angle at an aperture of the feed horn.

9. The system of claim 1 wherein the control system is further configured to adjust the subreflector tracking assembly at a periodic interval.

10. A method for reflector tracking with a dual reflector earth station antenna (ESA) system for transmitting uplink in a first frequency band and receiving downlink in a second frequency band, the ESA system including a feed horn optimized for a near-constant phase center for both the first frequency band and the second frequency band and a subreflector tracking assembly supported proximate a focal point of a reflector and capable of tracking in the X, Y and Z-axes, the method comprising:

adjusting the subreflector tracking assembly along X, Y and Z axes of the reflector until a signal gain of the reflector is maximized in the second frequency band; and whereby a signal gain of the reflector is also simultaneously maximized for the first frequency band due to the optimization of the feed horn for a near-constant phase center for both the first frequency band and the second frequency band.

11. The method of claim 10, wherein the adjusting of the subreflector tracking assembly is repeated at a periodic interval.

12. The method of claim 10, wherein the adjusting of the subreflector tracking assembly is initiated responsive to a change in temperature.

13. The method of claim 10, wherein the adjusting of the subreflector tracking assembly is initiated responsive to a preset time.

14. The method of claim 10, wherein a range of adjustment along the z-axis is less than 0.5 inches.

15. The method of claim 10, wherein the adjustment is enabled by a change in the signal gain.

16. The method of claim 10, further including the step of adjusting the subreflector tracking assembly with respect to a recorded position of the highest signal gain within a defined period: and resetting the recorded position if the adjusting of the subreflector tracking assembly results in a higher signal gain.

17. The method of claim 10, wherein the adjustment to the subreflector tracking assembly is performed via actuation of a linear actuator for each of the X, Y and Z-axis.

18. The method of claim 10 further comprising adjusting the subreflector tracking assembly via a reflector tracking assembly if at least one feedback sensor indicates that an X or Y-axis travel limit of the subreflector tracking assembly has been reached.

* * * * *